United States Patent

[11] 3,631,929

| [72] | Inventor | Robert B. Gates<br>Loraine, N. Dak. 58753 |
|---|---|---|
| [21] | Appl. No. | 47,025 |
| [22] | Filed | June 17, 1970 |
| [45] | Patented | Jan. 4, 1972 |

[54] HARROW TOOTH ATTACHMENT
1 Claim, 5 Drawing Figs.
[52] U.S. Cl. ...................................................... 172/643,
172/198, 172/707
[51] Int. Cl. ...................................................... A01b 23/02,
A01b 35/24
[50] Field of Search ............................................ 172/198,
643, 682, 683, 705, 707

[56] References Cited
UNITED STATES PATENTS

| 839,309 | 12/1906 | Nelson ......................... | 172/643 |
| 2,090,739 | 8/1937 | Wyss ............................ | 172/707 |
| 2,158,299 | 5/1939 | Oppenheim .................. | 172/707 |
| 2,805,613 | 9/1957 | Siems ........................... | 172/643 |

*Primary Examiner*—Robert E. Pulfrey
*Assistant Examiner*—C. W. Hanor
*Attorney*—Robert E. Kleve ABSTRACT: The invention comprises a harrow tooth attachment for attachment to the front of a grain drill. The attachment has a harrow tooth with the upper end wound about a pipe and fixed thereto. The pipe has a flange projecting upward from its upper end with a pair of bores for receiving a pair of bolts from a second separate flange and with the flanges engaging the opposite sides of a frame member on the front of the grain drill.

PATENTED JAN 4 1972 3,631,929
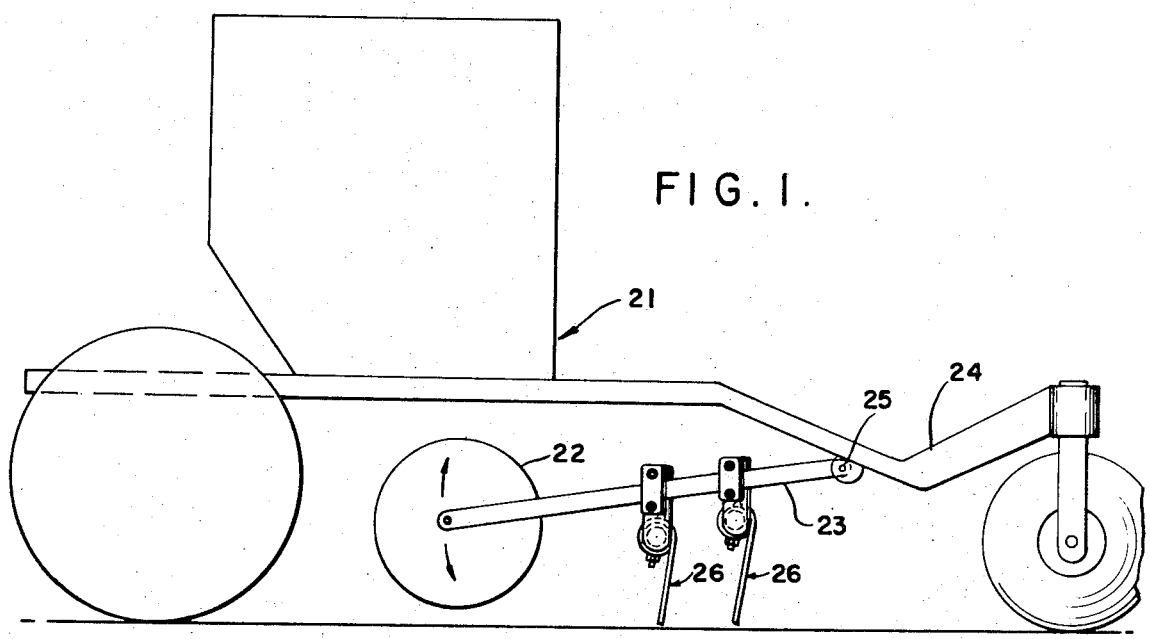
FIG.1.
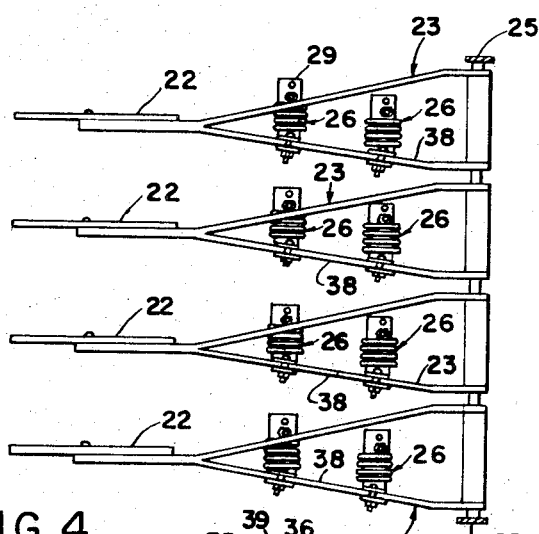
FIG.2.
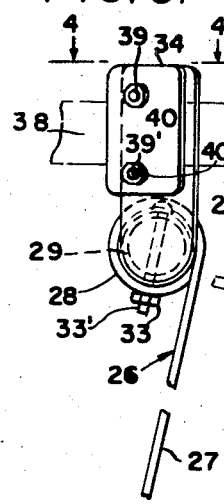
FIG.3.
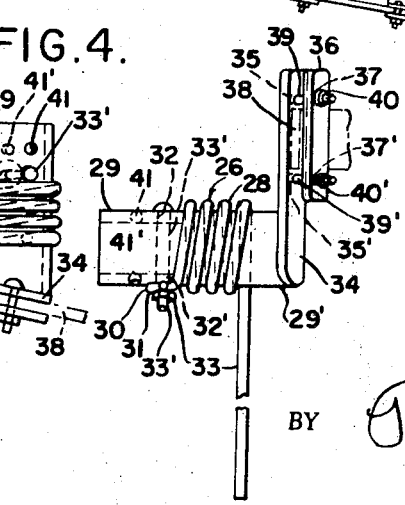
FIG.4.
FIG.5.
INVENTOR
ROBERT B. GATES
BY Robert E. Klene
ATTORNEY

HARROW TOOTH ATTACHMENT

This invention relates to a drill attachment, more particularly, the invention relates to harrow teeth attachments to grain drills.

It is an object of the invention to provide a novel harrow tooth attachment for the front of a grain drill.

It is a further object of the invention to provide a novel attachment for quickly attaching harrow teeth to the front of a grain drill.

Further objects and advantages of the invention will become apparent as the description proceeds and when taken in conjunction with the accompanying drawings wherein:

FIG. 1 is a side elevational view of a grain drill with the harrow teeth attachment mounted to the front of the drill.

FIG. 2 is a fragmentary top plan view of the grain drill with the harrow teeth attachments shown operatively mounted to the front of the grain drill.

FIG. 3 is an enlarged side view of harrow tooth attachment similar to FIG. 1.

FIG. 4 is a top plan view of the harrow tooth attachment taken along line 4—4 of FIG. 3.

FIG. 5 is a front elevational view of the harrow teeth attachment taken along line 5—5 of FIG. 3.

Briefly stated, the invention comprises a harrow tooth attachment for grain drills comprising a harrow tooth wound around a pipe and attached thereto, said pipe having a flange fixed at one end and projecting upward and connected to a second separate flange by a pair of bolts with the flanges encircling the frame member at the front of the grain drill.

Referring more particularly to the drawing, in FIG. 1, the harrow teeth attachments 20 are illustrated mounted to this grain drill 21.

The grain drill 21 is of a conventional type having disc 22 which one attached to the outer ends of disc frame members 23. The disc frame members 23 are pivotally mounted to the underside of the front 24 of the grain drill to pivot point 25.

The harrow tooth attachment invention 20 each has a spring rod harrow tooth 26. The tooth 26 has a straight lower end portion 27 with a coiled upper portion 28 which wraps around the pipe 29 of the attachment in axially spaced relation. The other end 30 of the tooth has a loop 31 and a bolt passes through the loop 31 and through a pair of bores 32 & 32' and a nut 33 is threaded onto the outer end of the bolt to fix the bolt 33' and harrow tooth 26 to the pipe. A metal flange 34 is welded to the end 29' of the pipe and projects upwardly therefrom. The flange 34 has a pair of bores 35 & 35' and a second metal flange 36 also has a pair of bores 37 & 37'.

The flanges 34 & 36 are placed on opposite sides of the frame portions 38 of the disc frame rod 23, with a pair of bolts 39 & 39' passing through the bores 37 & 37' and 35 & 35' and a pair of nuts 40 & 40' threaded onto the bolts to tighten the flanges 34 & 36 to the frame portion 38 to fix the pipe 29 and harrow tooth 26 to the frame portion 38.

The harrow teeth attachments will pivot up and down with the disc frame members 23, to adjust to variations in the contour of the ground.

The lower ends 27 of the harrow teeth will be sufficiently long enough to penetrate into the ground to harrow or work the ground.

A second pair of bores 41 & 41' are provided in the pipe 29 so that the harrow teeth 26 may be adjusted to different horizontal positions or the pipe by placing the bolt through the loop with the loop adjacent the lower bore 41' and further placing the bolt through the bores 41 & 41' and threading the nut onto the other end of the bolt.

It will be obvious that various changes and departures may be made to the invention without departing from the spirit thereof and accordingly it is not intended that the invention be limited to that specifically described in the specifications or as illustrated in the drawings but only as set forth in the appended claims wherein:

What is claimed is:

1. A harrow tooth attachment for attachment for attachment to the pivotally mounted disc frame member at the front of a grain drill and wherein said frame member has elongated rod portions, said attachment comprising a pipe, said pipe having bored openings therethrough, a harrow tooth rod having a straight lower end with an upper portion coiled around the pipe and terminating in a loop, a bolt passing through the loop and bore openings in the pipe, a nut threaded onto the outer end of the bolt to fix the harrow tooth to the pipe, a flange welded onto a end of the pipe, said flange engaging one side of the rod portion of the frame member, a plate engaging the other side of the rod portion of the frame member, rod flange and plate each having a pair of axially aligned bores with a pair of bolts passing through the bores above and below the rod portion, nuts threaded onto the outer ends of the pair of bolts to fix the flange and plate to the rod portion and thereby fix the pipe and harrow tooth to the rod portion of the disc frame member of the grain drill.

* * * * *